United States Patent [19]

Baker

[11] Patent Number: 4,467,837
[45] Date of Patent: * Aug. 28, 1984

[54] LINED HOSE INCLUDING A THERMOPLASTIC LINER BONDED TO A CASING BY HOT MELT ADHESIVE

[75] Inventor: Richard L. Baker, Ashland, Ohio

[73] Assignee: Applied Polymer Technology, Incorporated, Palmetto, Fla.

[ * ] Notice: The portion of the term of this patent subsequent to May 17, 2000 has been disclaimed.

[21] Appl. No.: 286,004

[22] Filed: Jul. 22, 1981

[51] Int. Cl.³ ............................................. F16L 11/12
[52] U.S. Cl. ..................... 138/119; 138/137; 138/DIG. 1
[58] Field of Search ............... 138/98, 119, 124, 125, 138/137, 141, DIG. 1; 156/149, 290, 291

[56] References Cited

U.S. PATENT DOCUMENTS

| | | | |
|---|---|---|---|
| 1,301,354 | 4/1919 | Baird | 138/119 |
| 2,687,749 | 8/1954 | Asher | 138/119 |
| 2,852,492 | 9/1958 | Williams et al. | 528/289 X |
| 3,372,148 | 3/1968 | Wiener | 428/473 X |
| 3,377,303 | 4/1968 | Peerman et al. | 546/186 X |
| 3,726,321 | 5/1973 | Phillips et al. | 138/125 X |
| 3,887,755 | 6/1975 | Zamer | 156/331.7 X |
| 4,097,629 | 6/1978 | Schneider | 156/291 X |
| 4,279,801 | 7/1981 | Kramer et al. | 525/440 X |

FOREIGN PATENT DOCUMENTS 737216  9/1955  United Kingdom ............... 138/125

Primary Examiner—Stephen Marcus
Assistant Examiner—Mark Thronson
Attorney, Agent, or Firm—Maky, Renner, Otto & Boisselle

[57] ABSTRACT

A lined hose has a hot melt adhesive bond between the thermoplastic liner and the outer thermoplastic fabric casing. The method of making this lined hose assembly includes the steps of extruding a tubular thermoplastic liner, applying hot melt adhesive to the liner, cooling and flattening the liner with adhesive, inserting the liner with adhesive into a hose casing, and bonding the liner to the thermoplastic casing by applying heat to melt and activate the adhesive and pressure to form the adhesive bond.

21 Claims, 5 Drawing Figures

U.S. Patent  Aug. 28, 1984  4,467,837
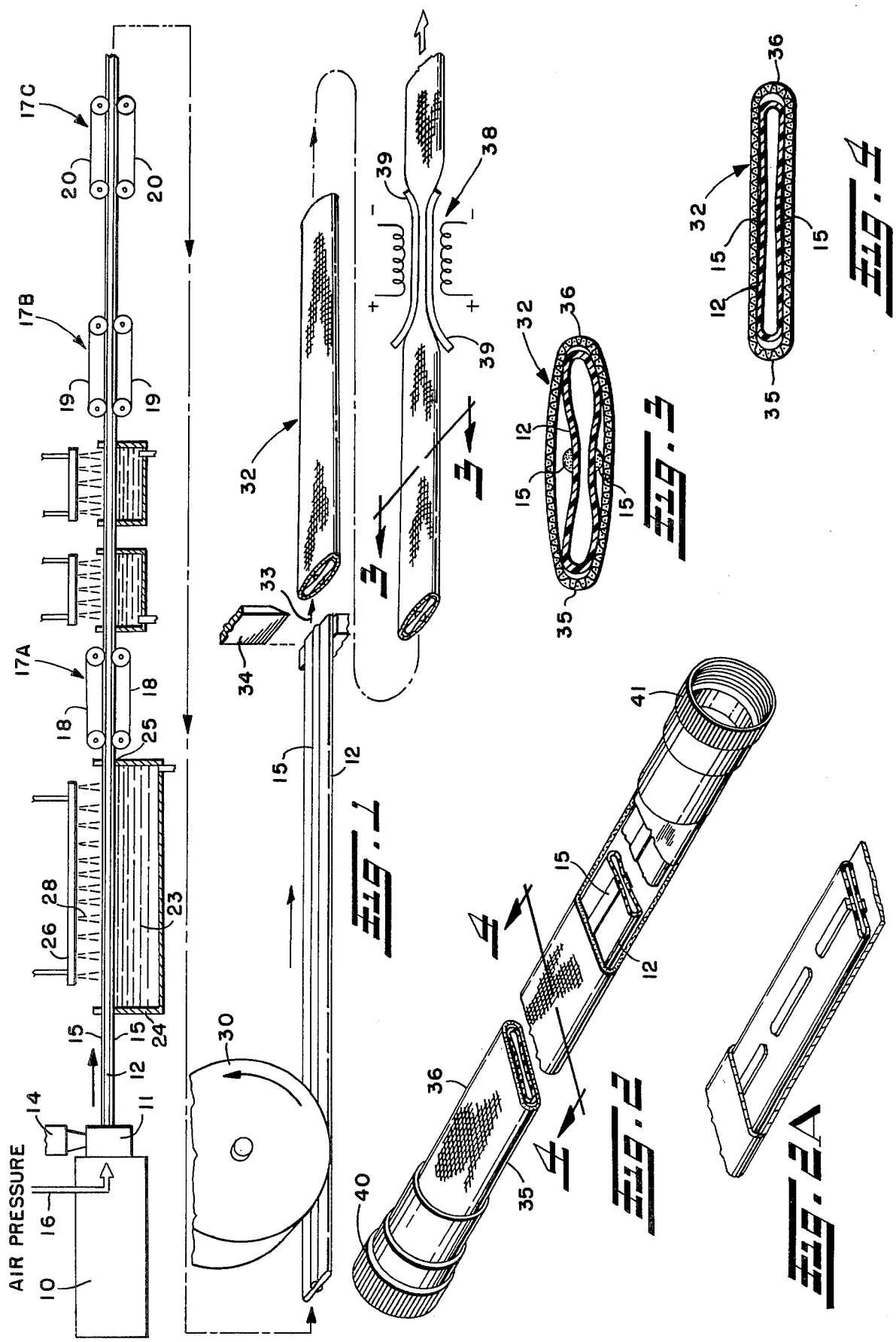

LINED HOSE INCLUDING A THERMOPLASTIC LINER BONDED TO A CASING BY HOT MELT ADHESIVE

BACKGROUND AND SUMMARY OF THE INVENTION

This invention relates to a hose consisting of a thermoplastic liner hot melt adhesively bonded to a fabric casing and to a method of making same, and is more particularly directed to such an assembly which is especially useful for fabricating a flat or collapsible hose.

Collapsible hoses lay flat when not in use, but inflate or radially enlarge when in use to pass water or other fluid under pressure. A collapsible hose may be compactly wound on itself to save storage space and facilitate handling. Collapsible hoses currently available on the market take several different structural forms made by several different manufacturing processes.

For example, collapsible hose assemblies used in domestic gardening often have a plastic liner and outer casing connected together only by their end hose fittings. In such structure, if one layer becomes twisted relative to the other through stretching, growth, or the like, water under pressure traveling through the hose will be partially or fully blocked. This blockage may cause the inner tube to rupture, resulting in a leak or even a potential explosion. Also, when woven fabric is used as the casing material, a tear, break, or other flaw in the fabric may cause it to unravel or become enlarged during filling and emptying of the hose. This in turn may result in the inner plastic liner forming a bubble or distorted enlargement, which eventually may cause the layers to separate or break or result in other damage to the hose, making the assembly unusable.

Another collapsible hose useful for domestic gardening is made from unlined polyvinyl chloride. However, such hose is rather expensive, heavy and bulky.

Lined fire hoses are also collapsible. Some fire hoses are made by vulcanizing the liner to the casing. These vulcanized hoses are relatively costly, heavy and bulky, and are made by a fairly slow vulcanization manufacturing process. Other fire hoses have a urethane liner bonded to the casing by a cross-linking or chain extending adhesive. These adhesives are applied to the liner in liquid form and then dried without curing by solvent or freezing systems. The liner with dried cross-linking or chain extending adhesive is then inserted into a casing and inflated with hot steam or oil to provide heat and pressure to adhesively connect the liner to the casing. This type of lined hose is expensive and time consuming to manufacture, and may lack uniformity in bond because some curing of the adhesive may occur in drying or insertion. Moreover, the pressurized expansion of the liner distorts and stresses the liner material and thins the liner wall at the interstices of the fabric.

A collapsible plastic hose assembly embodying the present invention is utilized by a hot melt adhesive bond joining the inner thermoplastic liner to the outer casing. This hot melt adhesive bond may be formed by one or more adhesive beads running the entire length of the inner liner tube and outer casing. When the casing is a woven fabic, the adhesive may become partially imbedded in the fabric to improve the bond and strengthen the fabric. This hot melt adhesive bond is achieved through preferred process steps of extruding a thermoplastic tubular liner and hot melt adhesive through a common die to form localized longitudinally extending adhesive beads on the extruded tubing, cooling and flattening the liner tubing with adhesive, inserting the cooled adhesive beaded liner into the casing and subjecting the liner and casing to localized heat and pressure to melt the adhesive and chemically and physically bond the tubing and casing together upon subsequent cooling.

OBJECTS AND ADVANTAGES OF THE INVENTION

It is the object of the present invention to provide a bonded thermoplastic liner and casing assembly and a method for making the same using hot melt adhesives. The temperarure characteristics of the temperature sensitive thermoplastic materials used for the liner, hot melt adhesive and casing must be interrelated to one another to permit the adhesive bond to be obtained without distorting the liner and casing materials and/or blocking the liner itself.

Another object is to provide a thermoplastic liner and casing bonded together along their entire length by a bead or beads of hot melt adhesive. The longitudinal bond by hot melt adhesive protects the liner material from objects piercing the casing, and the radial freedom or looseness of the liner between the bonds permits the liner to give to avoid objects piercing the casing.

Another object is to provide a woven fabric casing for a thermoplastic liner and casing hose assembly where hot melt adhesive bonding the liner to the fabric casing is imbedded or impregnated in the casing after final assembly.

Still another object of the invention is to provide a thermoplastic liner and outer casing assembly wherein the casing is formed by joining the edges of two pieces of fabric and a hot melt adhesive bead extends centrally longitudinally thereof between said edges on the exterior of the liner and within the casing. This longitudinal adhesive bead forms a bond between the liner and casing upon localized application of heat and pressure to reduce relative movements between the liner and casing.

Still another object of the invention is to provide a method for making a thermoplastic liner adapted for hose assembly procedures wherein a bead of hot melt adhesive is extruded on a length of thermoplastic tubing as the tubing itself is being extruded. The adhesive beaded liner tubing is cooled and sized to set the hot melt adhesive bead and to provide a normally flat cross-sectional configuration for the liner tube.

Another object is to provide a method for making a lined hose assembly wherein a length of thermoplastic liner with a set hot melt adhesive bead is drawn into a length of casing and the liner and casing are then pressed together under elevated temperature to melt and activate the adhesive and bond the liner and casing together.

Another object is to provide a bonded thermoplastic liner and casing forming a normally flat hose assembly which is strong, durable, lightweight, and very efficient in use, and which will resist twisting and distortion as the hose is filled with liquid and collapsed for storage.

These and other objects of the invention will become more apparent as the description proceeds, taken in conjunction with the accompanying drawing.

BRIEF DESCRIPTION OF THE DRAWING

In the drawing:

FIG. 1 is a schematic view showing an exemplary method according to the present invention for making a hose assembly having a hot melt adhesive bond between the thermoplastic liner and outer casing.

FIG. 2 is a perspective view of a length of normally flat hose embodying two opposed continuous hot melt adhesive bonds, with parts thereof being broken away for clarity of illustration.

FIG. 2A is a fragmentary view of a length of hose according to a specific embodiment of this invention, with parts broken away, illustrating a series of discontinuous beads of hot melt adhesive;

FIG. 3 is a section taken along the plane 3—3 in FIG. 1 showing the thermoplastic liner with set hot melt adhesive beads thereon inserted into the outer casing assembly before application of heat and pressure.

FIG. 4 is a sectional view similar to FIG. 3 but taken along the plane 4—4 of FIG. 2 after the application of heat and pressure which forms the adhesive bonds illustrated.

PREFERRED EMBODIMENT OF THE INVENTION

Referring now in more detail to the drawing and initially to FIG. 1, the process of the present invention includes a conventional plastic extruder 10 having a die 11 through which a cylindrical tubular thermoplastic liner 12 is extruded. For garden hose, the liner 12 preferably has a wall thickness of 8-10 thousandths of an inch and an initial diameter of approximately 0.515 inches. This thermoplastic liner may be made, for example, from polyurethanes, polyolefins, polyurethane-polyolefin blends, polyvinyl chlorides, and the like. As liner 12 is extruded, hot melt adhesive is applied to the radially outer surface of the liner.

Preferably, the hot melt adhesive is passed through an extruder 14 into an annular passage in the die 11. For heavier duty applications such as fire hose, the hot melt adhesive may be applied to the entire circumferential periphery of the liner. However, for garden or similar type hose, the annular passage, which encircles the tubular extrusion, has one or more openings therein to permit one or more discrete beads of hot melt adhesive to be applied to localized portions of the radially outer surface of the tubular liner. Preferably, two diametrically opposed beads 15 of hot melt adhesive are applied under extrusion pressure to the liner being extruded. For garden hose, the bead preferably has a height of approximately 20 thousandths of an inch and a width of approximately 90 thousandths of an inch. These beads may be longitudinally continuous or the hot melt adhesive may be intermittently extruded to provide an intermittent beading effect (FIG. 2A). Further, two beads of adhesive can be positioned generally diametrically opposite to one another and are positioned intermediate marginal edges of the flat casing (FIG. 3). In the absence of fluid pressure, the width of each bead of adhesive applied to the liner is from 5% to 12% of the circumference of the liner, and is preferably approximately 5.5% of the circumference of the liner. The term "bead" as used herein generically defines a continuous or intermittent adhesive bead application to the liner.

By extruding both the thermoplastic liner 12 and hot melt adhesive through a common die 11, the hot melt adhesive is dependably and uniformly applied to a liner having a true circular cross-section. This circular shape of the liner is initially maintained by introducing pressurized air in the liner during extrusion as schematically illustrated at 16 in FIG. 1.

Although co-extrusion of the hot melt adhesive and tubular liner in a common die is preferred, other means of applying the hot melt adhesive to the liner adjacent the extruder 10 may alternatively be employed. For example, a melting tank and pumping system applying adhesive through two diametrically opposed application heads could be employed. However, the propensity of such systems to have adhesive blockage requires the hot melt adhesive to be applied at higher, less desirable, temperatures than the preferred co-extrusion procedure.

As used herein, the term "hot melt adhesive" defines a thermoplastic elastomer normally solid at room temperature but fluidic at or above the melt point of the thermoplastic elastomer used. The hot melt adhesives used in accordance with the present invention consist of thermoplastic elastomers, or mixtures or blends of thermoplastic elastomeric materials having melt temperatures less than the heat distortion temperature of the casing material but about equal to or higher than the heat distortion and blocking temperatures of the liner material used in accordance with the present invention. Three hot melt adhesive formulations are particularly suitable for use in producing the hose assembly of the present invention. Each of these formulations are suitable for use in bonding any of the disclosed casing materials of the present invention with any of the disclosed liner materials of the present invention, although certain of these hot melt formulations are preferred for use with certain casing and liner materials.

The first of the preferred hot melt adhesive formulations consists of a mixture of about 10 to about 60 percent by weight, preferably about 13 percent by weight of a polyether-based thermoplastic polyurethane; and about 40 to about 90 percent-by-weight, preferably about 87 percent-by-weight of a polymeric fat acid polyamide. The polyurethane is prepared by charging to a reactor 1 mole of polytetramethylene ether glycol with a molecular weight of about 1000 and 1.5 moles of 1,4 butane diol and heating the charge to a temperature in the range of 230° F. to 285° F. Two and one-half moles of molten methylene di-para-phenylene isocyanate at a temperature of about 140° F. is added to the reactor and within about 30 seconds polyurethane resin forms. The polyurethane resin, in molten state, is poured on to a hot plate, the temperature of the hot plate being 230° F. The molten mixture solidifies on the hot plate. The solidified mixture is removed from the hot plate and is granulated. The granulated mixture of polyurethane is mixed with 0.5 parts by weight per 100 parts of granulated mixture of Irganox 1010, a product of Ciba Geigy identified as an antioxidant.

The polyamide is prepared by charging to a vessel 0.6 moles of a dimer acid based on tall oil having a dimer fat acid content greater than 65% by weight, 0.04 moles of isostearic acid and 0.4 moles of azelaic acid. The mixture is heated to a temperature of 120° F.-125° F. and then covered with a nitrogen blanket. Agitation is commenced and 1.02 moles of piperazine and 0.32 moles of ethylenediamine are added to the mixture. The mixture is heated to a temperature of 440° F. over a period of 2.5 to 3 hours and then heated for an additional 2 hours at 445° F.-450° F. The resulting polymer is removed from the vessel, solidified and granulated. The following additives are admixed: 0.002% by weight of Naugard 445, a product of Uniroyal identified as an antioxidant;

and 0.00005% by weight of polydimethyl siloxane. The preparation of polyamides of the foregoing type is disclosed, for example, in U.S. Pat. No. 3,377,703 which is incorporated herein by reference.

Thirteen parts by weight of the polyurethane discussed above and 87 parts by weight of the polyamide discussed above are physically mixed and extruded in extruder 14 at a temperature ranging from 300° F. to 425° F. with a screw that permits the temperature of the polymer to reach the range of 300° F. to 425° F. under low shear conditions, then subjects the molten polymer to high shear conditions to produce the hot melt adhesive beads 15. This formulation is particularly suitable for bonding a nylon fabric casing to a polyurethane liner. This formulation has a melt temperature of approximately 250° F., while the heat distortion temperatures for the preferred polyurethane liner and nylon fabric casing are approximately 205° F. and 350° F., respectively.

The second of the preferred hot melt adhesive formulations consists of a mixture of about 10 to about 25 percent-by-weight, preferably about 25 percent-by-weight of the polyurethane discussed above, up to about 50 percent-by-weight, preferably about 25 percent-by-weight of the polyamide discussed above, and from about 25 to about 90 percent-by-weight, preferably about 50 percent-by-weight of a thermoplastic copolyester discussed below.

The thermoplastic copolyester is prepared by mixing the following: 0.8 moles of terephthalic acid, 0.2 moles of azelaic acid, 1.5 moles of ethylene glycol, 0.3 moles of cyclohexane dimethanol, 0.6 moles of 1,6-hexanediol, and 0.76 parts-by-weight per 100 parts-by-weight of the acids of tetrakis (2-ethylhexyl) titanate. The batch is polymerized at 515° F. to 520° F. at 1 mm. Hg. with sparging to a viscosity of 700-800 ps at 450° C. The batch is cooled to 490° F.–495° F. within 1 to 1.5 hours and the resulting resin is granulated. The following materials are admixed with the resin: 0.1% by weight based on the weight of the resin of Irganox 1010; and 0.8% by weight based on the weight of the resin of Weston 618, a product of Ciba Geigy identified as an antioxidant. Twenty-five parts by weight of the polyurethane discussed above are mixed with 25 parts by weight of the polyamide discussed above and 50 parts by weight of the foregoing copolyester are physically mixed with each other and extruded in extruder 14 under the conditions indicated above to yield the hot melt adhesive beads 15. This formulation is particularly suited for bonding a polyester fabric casing to a polyurethane liner. This formulation has a melt temperature of approximately 275° F., while the heat distortion temperatures for the preferred polyurethane liner and polyester fabric casing are approximately 205° F. and 350° F., respectively.

The third of the preferred hot melt adhesive formulations consists of a mixture of from about 10 to about 60 percent-by-weight, preferably about 50 percent-by-weight of the polyurethane discussed above, and up to about 75 percent-by-weight, preferably about 40 to about 60 percent-by-weight of a polyester polyamide. This formulation can optionally include up to about 90 percent-by-weight of the polyamide discussed above.

The polyester-polyamide is made by mixing 70 parts by weight of the polyamide discussed above and 30 parts by weight of the copolyester discussed above and heating the mixture at 500° F. to effect ester interchange. Fifty parts by weight of the polyurethane discussed above are physically mixed with 50 parts by weight of the polyester-polyamide. The mixture is extruded in extruder 14 under the conditions indicated above to yield the hot melt adhesive beads 15. This formulation is particularly suited for bonding either a nylon or a polyester casing to a polyurethane liner. This formulation has a melt temperature of approximately 265° F., while the heat distortion temperatures for the liner end casing are approximately 205° F. and 350° F., respectively.

The thermoplastic liner 12 with hot melt adhesive beads 15 thereon leaves the extruder die 11 and is drawn or pulled along the process line by a plurality of spaced opposed nip belt stands indicated generally at 17A, 17B, and 17C. The nip belts 18 of stand 17A are generally flat and are spaced apart by a distance less than the diameter of the liner tube 12. Thus, as the liner is driven or drawn therethrough, the nip belts 18 begin to flatten the thermoplastic liner to impart an elliptical cross-sectional shape to the same. The opposed belts 19 and 20 of the ensuing stands 17B and 17C, respectively, are progressively more closely spaced to one another to impart a still further progressive flattening effect on the liner before the liner has been sufficiently water and air cooled to achieve its final flattened configuration or set.

With respect to such cooling, the liner 12 is promptly passed through a water cooling section, after leaving the extruder. The water cooling section includes an elongated water tank 23 having elevated end walls 24. Aligned blind end guidance slots 25 are provided in the respective end walls 24. The tank 23 is filled with water until the level thereof is generally coincident with the bottom of the guidance slots 25. The extruded liner 12 with hot melt adhesive beads 15 thereon is passed through and guided by the respective slots 25 in the end walls of tank 22 and is floated on the water for cooling and support purposes. A water manifold 26 is positioned directly above the liner passing through the tank 23. The manifold 26 has a plurality of bottom apertures therein to provide a water spray 28 contacting the upper or exposed tubular liner surfaces for cooling.

The initial water cooling section lowers the temperature of the extruded tubular liner with hot melt adhesive beads thereon enough to permit the liner and adhesive to be passed through nip belts 18 on stand 17A to provide flattening without tube damage or adhesion. The temperature of the liner tube with adhesive beads thereon is progressively decreased preferably in a smooth declining temperature gradient by using additional downstream water cooling sections and air exposure as required.

When the thermoplastic tubular liner with hot melt adhesive thereon has been brought to ambient temperature, the liner 12 is relatively flat in its configuration and has independent structural integrity. The hot melt adhesive beads on the cooled liner are set or solidified and have an indefinite shelf life. The cooled adhesively beaded liner may then be wound upon a reel 30 for storage purposes. The speed at which the liner is pulled through the process line to the reel is varied in accordance with the type of thermosetting liner material and hot melt adhesive being used. To this end, the respective opposed nip belts are synchronized not only with one another but also with the tubular liner and adhesive extruders to keep the tubular liner taut at the speed required to obtain the necessary cooling in the water and air cooling stations provided. The liner speed can vary from 50 ft. per minute to 180 ft. per minute with a speed of approximately 135 ft. per minute being best for the preferred polyurethane liner material and urethane based hot melt adhesive.

When hose assembly is initiated, the adhesively beaded liner is drawn from the reel 30 and is then inserted in a casing 32 as indicated by the arrow 33. When the liner is thus inserted, a shear 34 cuts the liner to substantially the same length as the casing 32.

The casing is normally flat and generally elliptical in crosssection as indicated in FIG. 3, thereby forming two marginal edges 35 and 36. The casing may be made from thermoplastic fibrous materials including nylon, polyester, polypropylene, or blends of the same. The wall thickness of the casing for garden hoses is preferably approximately 18 thousandths of an inch.

In order to obtain the hot melt adhesive bond between the thermoplastic liner and thermoplastic casing, as thus assembled, the temperature characteristics of the three temperature sensitive materials must have a critical relative relationship. In this regard, the casing fabric heat distortion temperature must be greater than the melt temperature of the hot melt adhesive, which in turn can be higher than the heat distortion temperature of the thermoplastic liner material but not so high as to cause blocking in the liner material.

When the adhesively beaded liner is initially inserted in such flat eliptical casing as shown in FIG. 3, the opposed hot melt adhesive beads 15 on the liner are preferably substantially centrally located between the marginal edges 35 and 36 of the casing. Although two beads are illustrated and preferred, one or more beads may be used at different relative locations to one another and to the casing as dictated by the hose strength requirements in the hose application selected.

The casing with tubular liner insert is then drawn into an adhesive activating unit, indicated generally at 38. This activation unit is primarily adapted for use with bead type adhesive application rather than peripheral adhesive application. In such unit, localized heating is applied to the exterior of the casing at the adhesive beaded areas of the assembly. The temperature imparted to the hot melt adhesive by such heating is greater than the melt point of the hot melt adhesive to activate the same, but the casing and lining temperatures achieved by such heating are less than the respective distortion temperatures for the casing and liner materials because of the decreasing temperature gradient from the outside to the inside of the assembly. At substantially the same time, localized pressure is also applied to the assembly at the adhesive bead areas, as indicated by the opposed pressure plates 39 schematically shown in FIG. 1. This pressure is of sufficient magnitude to obtain suitable hot melt adhesive bonding conditions, e.g. pressure and flow, between the liner and casing without having the liner bond to itself. As a result of having two diametrically opposed beads of limited width, the pressure plates acting in opposition to one another can form the hot melt adhesive bonding conditions by exerting less load against the materials than would be required for a complete circumferential bond. This lower bond load results in pressure of about 75 psi to about 100 psi and is less likely to damage the casing and liner materials. The adhesive bond strength between the liner and casing is enhanced by subsequent cooling.

As a result of the pressure and temperature activation, a mechanical and chemical hot melt adhesive bond is obtained between the liner and casing longitudinally along the adhesive bead areas as indicated in FIG. 4. With a fabric casing, some of the hot melt adhesive may be imbedded or impregnated in the fabric itself to increase the strength of the casing material. The bonded liner and casing assembly is then cooled to set the hot melt adhesive. For a garden hose, the final thickness of the entire flat hose is approximately 50 to 70 thousandths of an inch.

To complete the assembly, conventional hose fittings 40 and 41 are applied to the opposite ends of the hose thereof. With the assembly thus completed, the hose (i.e. the liner and casing) normally lies in a flattened configuration that can be readily wound on a reel or the like for compact storage. When in use, the tubing ad casing simultaneously radially expand to a substantially circular cross-section to transmit water or other pressurized fluid. When the hose is empty, the bonded liner and casing move together in returning to the normally flat configuration shown in FIG. 4.

The hot melt adhesive bonding of the liner to the casing provides a positive or efficient bond that minimizes the twisting or distortion of the liner relative to the casing. Also, by using adhesive beads, the liner is protected from piercing objects penetrating the casing by the beads themselves and by the liner flexing between the beads. The method for making this hot melt adhesively bonded lined hose is accomplished by readily performed steps which do not require conventional solvent removal and do not require extended adhesive cure times.

Although the invention has been shown and described with respect to the preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A lined hose assembly comprising a length of flexible tubular liner, a flexible hose casing containing said tubular liner, and a hot melt adhesive in a longitudinal bead between said liner and said casing to bond a portion of said liner to a corresponding portion of said casing, said hot melt adhesive being selected from the group consisting of:
   (a) a hot melt adhesive comprising from about 10 to about 60 percent-by-weight of a polyether-based thermoplastic polyurethane and about 40 to about 90 percent-by-weight of polymeric fat acid polyamide;
   (B) a hot melt adhesive comprising from about 10 to about 25 percent-by-weight of a polyether-based thermoplastic polyurethane, up to about 50 percent-by-weight of a polymeric fat acid polyamide, and from about 25 to about 90 percent-by-weight of a thermoplastic copolyester; and
   (C) a hot melt adhesive comprising from about 10 to about 60 percent-by-weight of a polyether based thermoplastic polyurethane, up to about 90 percent-by-weight of a polymeric fat acid polyamide, and up to about 75 percent-by-weight of a polyester polyamide.

2. The hose assembly of claim 1, wherein said hot melt adhesive comprises from about to 10 to about 60 percent-by-weight of a polyether-based thermoplastic polyurethane and about 40 to about 90 percent-by-weight of a polymeric fat acid polyamide.

3. The hose assembly of claim 1, wherein said hot melt adhesive comprises from about 10 to about 25 percent-by-weight of a polyether-based thermoplastic polyurethane, up to about 50 percent-by-weight of a polymeric fat acid polyamide, and from about 25 to about 90 percent-by-weight of a thermoplastic copolyester.

4. The hose assembly of claim 1 wherein said hot melt adhesive comprises from about 10 to about 60 percent-by-weight of a polyether-based thermoplastic polyurethane, up to about 90 percent-by-weight of a polymeric fat acid polyamide, and up to about 75 percent-by-weight of a polyester polyamide.

5. A liner adapted for use in a lined hose assembly comprising an extruded thermoplastic tubular liner having a generally flat cross-section and a thermoplastic hot melt adhesive set on at least a portion of the liner, said thermoplastic hot melt adhesive having a melt temperature equal to or higher than the blocking and heat distortion temperatures of said thermoplastic liner, said hot melt adhesive being selected from the group consisting of:
(A) a hot melt adhesive comprising from about 10 to about 60 percent-by-weight of a polyether-based thermoplastic polyurethane and about 40 to about 90 percent-by-weight of polymeric fat acid polyamide;
(B) a hot melt adhesive comprising from about 10 to about 25 percent-by-weight of a polyether-based thermoplastic polyurethane, up to about 50 percent-by-weight of a polymeric fat acid polyamide, and from about 25 about 90 percent-by-weight of a thermoplastic copolyester; and
(C) a hot melt adhesive comprising from about 10 to about 60 percent-by-weight of a polyether based thermoplastic polyurethane, up to about 90 percent-by-weight of a polymeric fat acid polyamide, and up to about 75 percent-by-weight of a polyester polyamide.

6. The liner of claim 5, wherein said thermoplastic hot melt adhesive comprises from about 10 to about 60 percent-by-weight of a polyether-based thermoplastic polyurethane and about 40 to about 90 percent-by-weight of a polymeric fat acid polyamide.

7. The liner of claim 5 wherein said thermoplastic hot melt adhesive comprises from about 10 to about 25 percent-by-weight of a polyether-based thermoplastic polyurethane, up to about 50 percent-by-weight of a polymeric fat acid polyamide, and from about 25 to about 90 percent-by-weight of a thermoplastic copolyester.

8. The liner of claim 5 wherein said thermoplastic hot melt adhesive comprises from about 10 to about 60 percent-by-weight of a polyether-based thermoplastic polyurethane, up to about 90 percent-by-weight of a polymeric fat acid polyamide, and up to about 75 percent-by-weight of a polyester polyamide.

9. A lined hose assembly comprising a length of flexible tubular liner adapted to be folded flat along diametrically opposite longitudinal fold lines, a flexible hose casing containing said tubular liner, and a hot melt adhesive applied in at least one longitudinal bead to said liner and disposed between said liner and said casing to bond a portion of said liner to a corresponding portion of said casing, said bead having a width of about 5 percent to about 12 percent of the circumference of said liner.

10. The lined hose assembly of claim 9 wherein the liner is a thermoplastic material, the hot melt adhesive is a thermoplastic elastomer, and the casing is a thermoplastic fabric.

11. The lined hose assembly of claim 10 wherein the casing has a heat distortion temperature greater than the melt temperature of the hot melt adhesive, which in turn is equal to or higher than the blocking and heat distortion temperatures of the liner.

12. The lined hose assembly of claim 11 wherein said liner and casing are generally flat and elliptical in cross-section when empty, but radially expand to transmit fluid under pressure.

13. The lined hose assembly of claims 10 or 11 wherein the hot melt adhesive bead consists of at least one continuous bead extending longitudinally of the liner for substantially its entire length.

14. The lined hose assembly of claims 10 or 11 wherein the hot melt adhesive bead consists of at least one discontinuous bead extending longitudinally of the liner for substantially its entire length.

15. The lined hose assembly of claim 13 wherein two beads of hot melt adhesive are positioned generally diametrically opposite to one another and are positioned between marginal edges of said flat casing.

16. The lined hose assembly of claim 14, wherein two beads of hot melt adhesive are positioned generally diametrically opposite to one another and are positioned between marginal edges of said flat casing.

17. A lined hose assembly for carrying fluid under pressure comprising a length of circumferentially uniform flexible tubular liner, a flexible circumferentially uniform hose casing containing said tubular liner, a first portion of said tubular liner being pressed into tight engagement with a portion of the interior of said casing upon admission of fluid under pressure into said liner, and a hot melt adhesive in a narrow longitudinal bead between said liner and said casing bonding a second portion of said liner to a corresponding portion of said casing.

18. The assembly of claim 17 wherein the width of said bead of adhesive is approximately 5.5% of the circumference of said liner in the absence of fluid pressure in said assembly.

19. The assembly of claim 18 including two narrow beads of adhesive, the width of each being approximately 5.5% of the circumference of said liner in the absence of fluid under pressure in said assembly.

20. The assembly of claim 19 wherein said liner and casing fold flat in the absence of fluid under pressure.

21. The liner of claim 20 wherein two diametrically opposed beads of hot melt adhesive are positioned on the exterior of said liner generally intermediate marginal edges of said flat liner.

* * * * *